(12) United States Patent
Gear et al.

(10) Patent No.: US 8,508,475 B2
(45) Date of Patent: Aug. 13, 2013

(54) USER INTERFACE ELEMENTS POSITIONED FOR DISPLAY

(75) Inventors: Gavin M. Gear, Bothell, WA (US); Ross N. Luengen, Sammamish, WA (US); Michael C. Miller, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1018 days.

(21) Appl. No.: 12/257,851

(22) Filed: Oct. 24, 2008

(65) Prior Publication Data

US 2010/0103098 A1 Apr. 29, 2010

(51) Int. Cl.
*G06F 3/33* (2006.01)

(52) U.S. Cl.
USPC ........... 345/158; 345/157; 345/163; 345/165; 345/166; 345/167

(58) Field of Classification Search
USPC ................. 345/156–184; 701/472, 433, 408; 715/764, 764.863, 825, 744; 463/13; 361/679.03; 348/14.04
See application file for complete search history.

(56) References Cited

U.S. PATENT DOCUMENTS

| | | | | |
|---|---|---|---|---|
| 6,132,391 A * | 10/2000 | Onari et al. | .................... | 600/595 |
| 6,151,208 A * | 11/2000 | Bartlett | .................... | 361/679.03 |
| 6,396,482 B1 | 5/2002 | Griffin et al. | | |
| 6,546,336 B1 * | 4/2003 | Matsuoka et al. | ............ | 701/472 |
| 7,289,102 B2 * | 10/2007 | Hinckley et al. | .............. | 345/156 |
| 7,336,266 B2 | 2/2008 | Hayward et al. | | |
| 7,406,666 B2 * | 7/2008 | Davis et al. | .................... | 715/863 |
| 7,536,650 B1 * | 5/2009 | Robertson et al. | ............ | 715/767 |
| 7,626,569 B2 * | 12/2009 | Lanier | ........................... | 345/156 |
| 7,856,605 B2 * | 12/2010 | Ording et al. | ................. | 715/856 |
| 7,978,182 B2 * | 7/2011 | Ording et al. | ................. | 345/173 |
| 8,245,143 B2 * | 8/2012 | Yach et al. | .................... | 715/744 |
| 2002/0021278 A1 * | 2/2002 | Hinckley et al. | .............. | 345/156 |
| 2003/0210233 A1 | 11/2003 | Frulla | | |
| 2004/0012572 A1 * | 1/2004 | Sowden et al. | ............... | 345/173 |
| 2004/0165010 A1 * | 8/2004 | Robertson et al. | ............ | 345/805 |
| 2004/0239753 A1 * | 12/2004 | Proctor et al. | ............. | 348/14.04 |
| 2005/0197722 A1 * | 9/2005 | Varone et al. | .................... | 700/83 |
| 2005/0219223 A1 * | 10/2005 | Kotzin et al. | ................. | 345/173 |
| 2007/0124503 A1 | 5/2007 | Ramos et al. | | |
| 2007/0268269 A1 | 11/2007 | Chang et al. | | |
| 2007/0268273 A1 | 11/2007 | Westerman et al. | | |
| 2007/0296707 A1 | 12/2007 | Kang et al. | | |
| 2008/0117184 A1 | 5/2008 | Gettemy | | |
| 2008/0180399 A1 | 7/2008 | Cheng | | |
| 2008/0211778 A1 * | 9/2008 | Ording et al. | ................. | 345/173 |
| 2008/0259040 A1 * | 10/2008 | Ording et al. | ................. | 345/173 |

(Continued)

OTHER PUBLICATIONS

103744 Specification whole document (U.S. Appl. No. 61/103,744).*
103744 Drawing-only Black and white line drawings, whole document (U.S. Appl. No. 61/103,744).*
Kim, Kee-Eung et al., "Hand Grip Pattern Recognition for Mobile User Interfaces", http://www.alice.org/stage3/pubs/uistsensing.pdf, Interaction Lab / Samsung Advanced Institute of Technology,(2006),1-6.

(Continued)

*Primary Examiner* — Prabodh M Dharia
(74) *Attorney, Agent, or Firm* — Wolfe-SBMC

(57) ABSTRACT

User interface elements positioned for display is described. In various embodiment(s), sensor input can be received from one or more sensors that are integrated with a portable device. A device hold position that corresponds to where the portable device is grasped by a user can be determined based at least in part on the sensor input. A display of user interface element(s) can then be initiated for display on an integrated display of the portable device based on the device hold position that corresponds to where the portable device is grasped.

20 Claims, 5 Drawing Sheets

(56) References Cited

U.S. PATENT DOCUMENTS

| | | | |
|---|---|---|---|
| 2008/0320408 A1* | 12/2008 | Dziezanowski | 715/771 |
| 2009/0024943 A1* | 1/2009 | Adler et al. | 715/764 |
| 2009/0100096 A1* | 4/2009 | Erlichson et al. | 707/104.1 |
| 2009/0174680 A1* | 7/2009 | Anzures et al. | 345/173 |
| 2009/0176547 A1* | 7/2009 | Katz | 463/13 |
| 2009/0195959 A1* | 8/2009 | Ladouceur et al. | 361/283.1 |
| 2010/0088639 A1* | 4/2010 | Yach et al. | 715/825 |
| 2010/0134423 A1* | 6/2010 | Brisebois et al. | 345/173 |
| 2011/0080364 A1* | 4/2011 | Ording et al. | 345/173 |

OTHER PUBLICATIONS

Hinckley, Ken et al., "Sensing Techniques for Mobile Interaction", http://ailab.kaist.ac.kr/webfm_send/19, Microsoft Research, (2000),1-10.

Fallot-Burghardt, W et al., "Touch & Type: A Novel Pointing Device for Notebook Computers", http://www.t2i.se/pub/papers/Fallot_NordiCHI06.pdf, ETH Zurich, 1-4, 2006.

* cited by examiner

USER INTERFACE ELEMENTS POSITIONED FOR DISPLAY

BACKGROUND

Portable computer devices are increasingly more common and mobile, such as laptop computers, tablet PCs, ultra-mobile PCs, as well as other mobile data, messaging, and/or communication devices. When a user holds a small, portable device such as a slate tablet PC or ultra-mobile PC that has a touch-screen, a common interaction technique is to hold the device with one hand and interact with the touch-screen with the fingers of the other hand. For example, the user can tap-touch targets or user interface elements on the touch-screen with a finger. Portable devices, however, do not account for where a user grips and holds a device in relation to where user interface elements are displayed in a user interface on the device touch-screen. Thus, a user may obscure or otherwise interfere with selectable controls that are displayed in a user interface with the hand that holds or grips the device. This may cause the user to have to change hands from a preferred position when holding a portable device, and adopt an uncomfortable or less than optimal grip on the device to allow for touch-screen interaction.

SUMMARY

This summary is provided to introduce simplified concepts of user interface elements positioned for display. The simplified concepts are further described below in the Detailed Description. This summary is not intended to identify essential features of the claimed subject matter, nor is it intended for use in determining the scope of the claimed subject matter.

User interface elements positioned for display is described. In various embodiment(s), sensor input can be received from one or more sensors that are integrated with a portable device. A device hold position that corresponds to where the portable device is grasped by a user can be determined based at least in part on the sensor input. A display of user interface element(s) can then be initiated for display on an integrated display of the portable device based on the device hold position that corresponds to where the portable device is grasped.

In other embodiment(s) of user interface elements positioned for display, a display position of user interface element(s) in a user interface can be designated when the display of the user interface element(s) is initiated. The user interface can include multiple display regions in which the user interface element(s) can be positioned for display. In an embodiment, a device hold position is adjacent to a display region of the user interface, and the display region includes the display position of the user interface element(s). This provides for interaction by a user with the user interface element(s) displayed on a touch-screen of the device using a hand that is holding the device. In another embodiment, the device hold position is adjacent to a first display region of the user interface, and the display position of the user interface element(s) corresponds to a second display region of the user interface that is not adjacent to the device hold position. This provides that a user does not obscure or interfere with the user interface element(s) displayed on a touch-screen of the device with a hand that is holding the device.

In other embodiment(s) of user interface elements positioned for display, a new device hold position can be determined based at least in part on a change in the sensor input, and a new display position to display the user interface element(s) in the user interface can be determined, where the new display position in the user interface is based on the new device hold position. In embodiments, the one or more sensors that sense, or otherwise detect, where a portable device is being grasped can include any type of contact and/or non-contact sensors that are integrated proximate, or with, any one or combination of a front surface, rear surface, or side surface of the portable device.

BRIEF DESCRIPTION OF THE DRAWINGS

Embodiments of user interface elements positioned for display are described with reference to the following drawings. The same numbers are used throughout the drawings to reference like features and components.

DETAILED DESCRIPTION

Embodiments of user interface elements positioned for display provide that user interface elements in a user interface can be positioned for display on an integrated display of a portable device based at least in part on where the portable device is grasped, or otherwise held by a user. Sensors can be integrated with the portable device, such as proximate any one or combination of a front surface, rear surface, or side surfaces of the device, and the sensors can generate sensor input that corresponds to a device hold position that indicates where the device is being grasped by a user.

The user interface elements can be positioned on the display in the user interface such that the user interface elements are not obscured by or otherwise interfered with when a user holds the portable device. This allows a user to more easily interact and select the user interface elements when displayed on the portable device. A user interface element can also be positioned for display such that a user can interact and select the user interface element with fingers of a hand that is grasping or otherwise holding the portable device.

While features and concepts of the described systems and methods of user interface elements positioned for display can be implemented in any number of different environments, systems, and/or various configurations, embodiments of user interface elements positioned for display are described in the context of the following example systems and environments.

Figure 1:
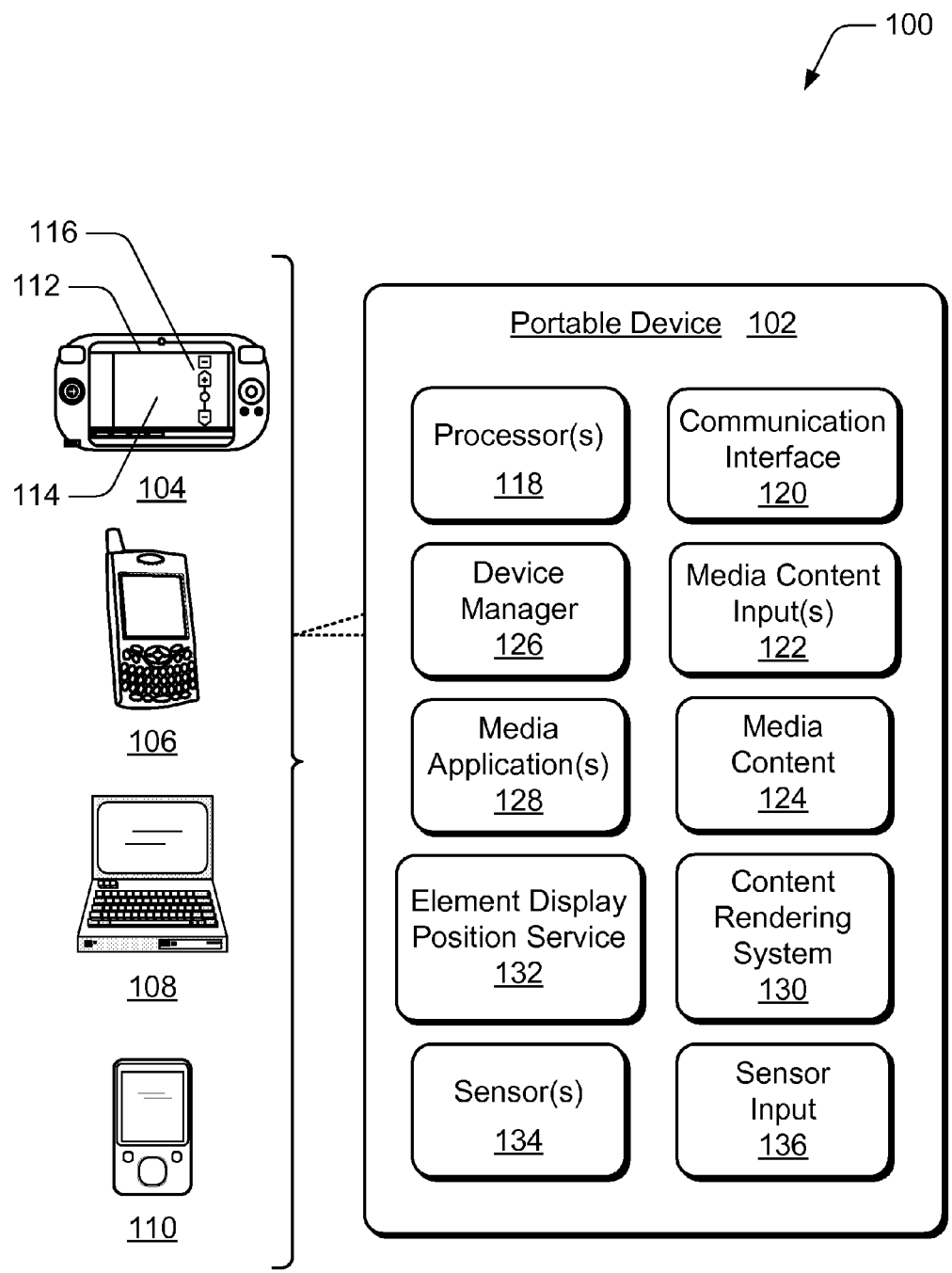
FIG. 1 illustrates an example system in accordance with one or more embodiments of user interface elements positioned for display.

FIG. 1 illustrates an example system 100 in which various embodiments of user interface elements positioned for display can be implemented. Example system 100 includes a portable device 102 (e.g., a wired and/or wireless device) that can be any one or combination of an ultra-mobile personal computer (UMPC) 104, a personal digital assistant (PDA), a mobile phone 106 (e.g., cellular, VoIP, WiFi, etc.) that is implemented for data, messaging, and/or voice communications, a portable computer device 108 (e.g., a laptop computer, a laptop computer with a touch-screen, etc.), a media device 110 (e.g., a personal media player, portable media player, etc.), a gaming device, an appliance device, an electronic device, and/or any other type of portable device that can receive, display, and/or communicate data in any form of audio, video, and/or image data.

Each of the various portable devices can include an integrated display and/or an integrated touch-screen display, as well as selectable input controls via which a user can input data. For example, UMPC 104 includes an integrated display 112 on which a user interface 114 can be displayed that can include user interface elements 116, such as any type of image, graphic, text, selectable button, user-selectable controls, menu selection, map element, and/or any other type of user interface displayable feature or item.

Any of the various portable devices described herein can be implemented with one or more sensors, processors, communication components, media content inputs, memory components, storage media, signal processing and control circuits, and a content rendering system. Any of the portable devices can also be implemented for communication via communication network(s) that can include any type of a data network, voice network, broadcast network, an IP-based network, and/or a wireless network that facilitates data, messaging, and/or voice communications. A portable device can also be implemented with any number and combination of differing components as described with reference to the example device shown in FIG. 5. A portable device may also be associated with a user (i.e., a person) and/or an entity that operates the device such that a portable device describes logical devices that include users, software, and/or a combination of devices.

In this example, portable device 102 includes one or more processors 118 (e.g., any of microprocessors, controllers, and the like), a communication interface 120 for data, messaging, and/or voice communications, and media content input(s) 122 to receive media content 124. Media content (e.g., to include recorded media content) can include any type of audio, video, and/or image media content received from any media content source, such as television media content, music, video clips, data feeds, interactive games, network-based applications, and any other content. Portable device 102 also includes a device manager 126 (e.g., a control application, software application, signal processing and control module, code that is native to a particular device, a hardware abstraction layer for a particular device, etc.).

Portable device 102 can include various media applications 128 that can be processed, or otherwise executed, by the processors 118, such as a music and/or video player, a Web browser, an email application, and the like. Portable device 102 includes a content rendering system 130 that can render user interfaces from the media applications 128 to generate a display on any of the portable devices. Portable device 102 also includes an element display position service 132 that can be implemented as computer-executable instructions and executed by the processors 118 to implement various embodiments and/or features of user interface elements positioned for display. In an embodiment, the element display position service 132 can be implemented as a component or module of the device manager 126.

In this example, portable device 102 includes one or more sensors 134 that sense or otherwise detect where the device is being grasped or held by a user. The sensors 134 generate sensor input 136 to the element display position service 132. The sensors 134 can be integrated with portable device 102 and can include one or more of a variety of suitable sensors, such as contact sensors (e.g., a resistive touch sensor), non-contact sensors (e.g., a capacitive proximity sensor), point sensors associated with a specific position or location on the portable device, linear strip sensors, infrared sensors, proximity sensors, and the like. One or more of the sensors 134 can be integrated with the portable device 102 at a particular region of the device to detect when the portable device is being held or grasped in the particular region.

The element display position service 132 at portable device 102 receives sensor input 136 from any of the sensors 134 and determines a device hold position that corresponds to where the portable device is being grasped or otherwise held by a user. The element display position service 132 can initiate the display of user interface elements in a user interface on an integrated display of the device based on the device hold position. For example, the element display position service 132 can determine an optimal or recommended display region on the integrated display to display the user interface elements, and can provide the optimal or recommended display region to a media application 128. Alternatively or in addition, the element display position service 132 can detect that more than one media application 128 is being executed on the portable device 102, and provide an indication of the device hold position to the media applications. The media applications 128 can then use the device hold position to determine a display region of the user interface in which to display user interface elements associated with the media applications.

The element display position service 132 can also clear a user interface display of user interface elements based on an indication that the portable device 102 is not being held or otherwise grasped by a user. For example, if a user puts the portable device down and is not holding the device, user interface elements can be cleared from a user interface display to allow additional display space that can be utilized by other applications and/or for other purposes (e.g., for media playback).

Example method 200 is described with reference to FIG. 2 in accordance with one or more embodiments of user interface elements positioned for display. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. Example method 200 may be described in the general context of computer-executable instructions, which can include software, applications, routines, programs, objects, components, data structures, procedures, modules, functions, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 2:
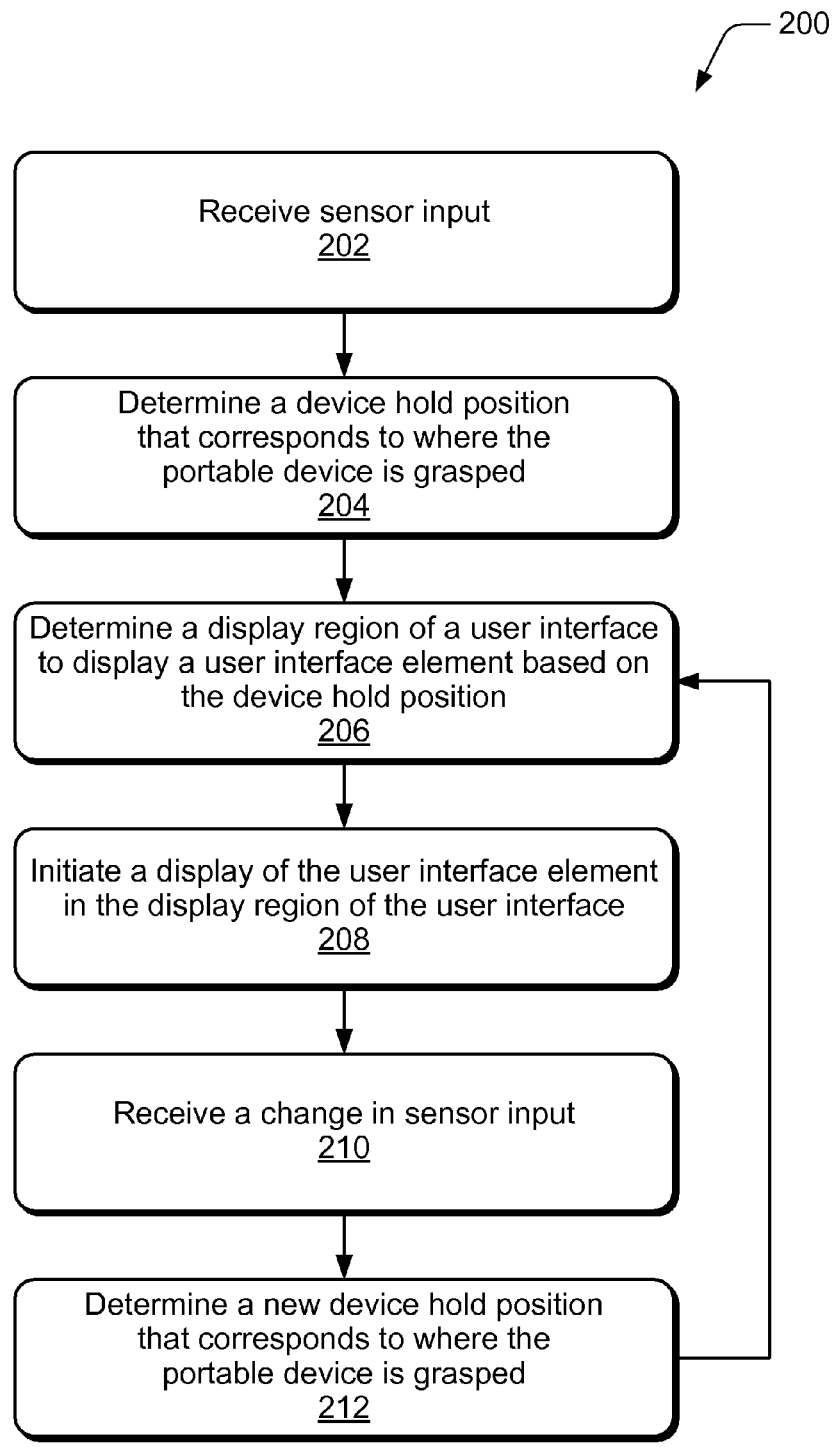
FIG. 2 illustrates example method(s) of user interface elements positioned for display in accordance with one or more embodiments.

FIG. 2 illustrates example method(s) 200 of user interface elements positioned for display. The order in which the method is described is not intended to be construed as a limitation, and any number of the described method blocks can be combined in any order to implement the method, or an alternate method.

At block 202, sensor input is received. For example, portable device 102 (FIG. 1) includes sensors 134 that generate sensor input 136 which is received by the element display position service 132. Sensor input 136 can be generated when a user grasps or holds a portable device 102 and contacts or is proximate the sensors 134. At block 204, a device hold position is determined that corresponds to where the portable device is grasped. For example, sensor input 136 indicates that a user has grasped the portable device 102 and the element display position service 132 determines the particular position as the device hold position on the portable device.

At block 206, a display region of a user interface is determined to display a user interface element based on the device hold position. For example, the element display position service 132 determines that the portable device 102 is grasped at a particular position on the device, and to avoid obscuring and/or interfering with user interface element(s), a display region is specified at a region of the user interface that is not adjacent or near where the portable device is grasped. Alternatively, the display region can be adjacent to the device hold position.

At block 208, a display of the user interface element is initiated in the display region of the user interface. For example, the element display position service 132 provides the display region to a media application 128 that initiates displaying the user interface element associated with the media application at or proximate the determined display region. At block 210, a change in sensor input is received. For example, the element display position service 132 receives a change in sensor input 136 when a user of the portable device 102 changes where the portable device is grasped, and the sensors 134 generate sensor input 136 that indicates this change.

At block 212, a new device hold position is determined that corresponds to where the portable device is grasped. For example, a change in sensor input 136 received from sensors 134 indicates that a user has changed the position or location where the portable device 102 is being grasped or held, and the element display position service 132 determines the new device hold position. The method then continues at block 206 to determine a new display region of the user interface to display the user interface element.

For example, a user interface element displayed at a particular region in a user interface on an integrated display of portable device 102 can be moved to a different region of the user interface based on the new device hold position. The element display position service 132 can be implemented to move a user interface element on the display and/or initiate a media application to move the user interface element by any number of techniques, such as instantly, by animation, by re-displaying the user interface element at a different position, and the like. The element display position service 132 can also initiate a user interface orientation change between a landscape orientation and a portrait orientation based on a change in the portable device hold position.

Figure 3:
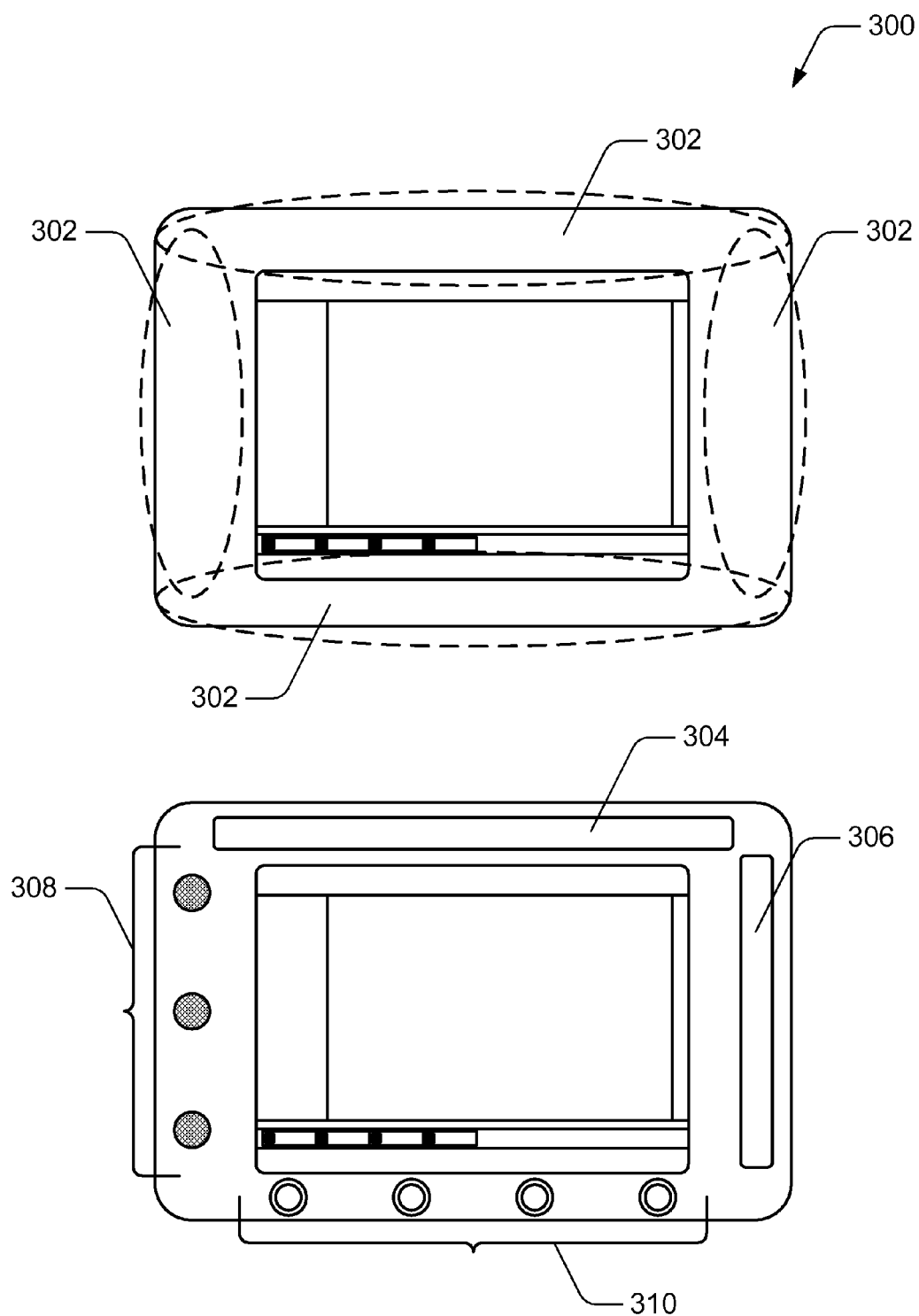
FIG. 3 illustrates an example of a portable device in accordance with one or more embodiments of user interface elements positioned for display.

FIG. 3 illustrates an example of a portable device 300 in accordance with one or more embodiments of user interface elements positioned for display. Portable device 300 (shown in two views) is an example of any of the various types of portable devices described with reference to FIG. 1. Portable device 300 includes various sensor regions 302 (as depicted by the dashed lines merely for illustration purposes) which are example regions of a portable device where sensors can be positioned or otherwise integrated to detect that the portable device is being grasped or held, and to generate sensor input. The sensor regions can include various sensors that are integrated on and/or proximate to a front surface, rear surface, and/or side surfaces of the portable device. The sensor regions 302 are merely examples and any suitable region, position, location, and/or point on a portable device can be utilized to integrate one or more different types of sensors with the device.

Portable device 300 can include different types of sensors that are integrated with the device in the various sensor regions 302. In this example, portable device 300 includes strip sensors 304 and 306, as well as various point sensors 308 and 310. Other types of sensors as described above can be integrated in the sensor regions with the portable device, such as contact sensors (e.g., a resistive touch sensor), non-contact sensors (e.g., a capacitive proximity sensor), point sensors associated with a specific position or location on the portable device, linear strip sensors, infrared sensors, proximity sensors, and the like.

Figure 4:
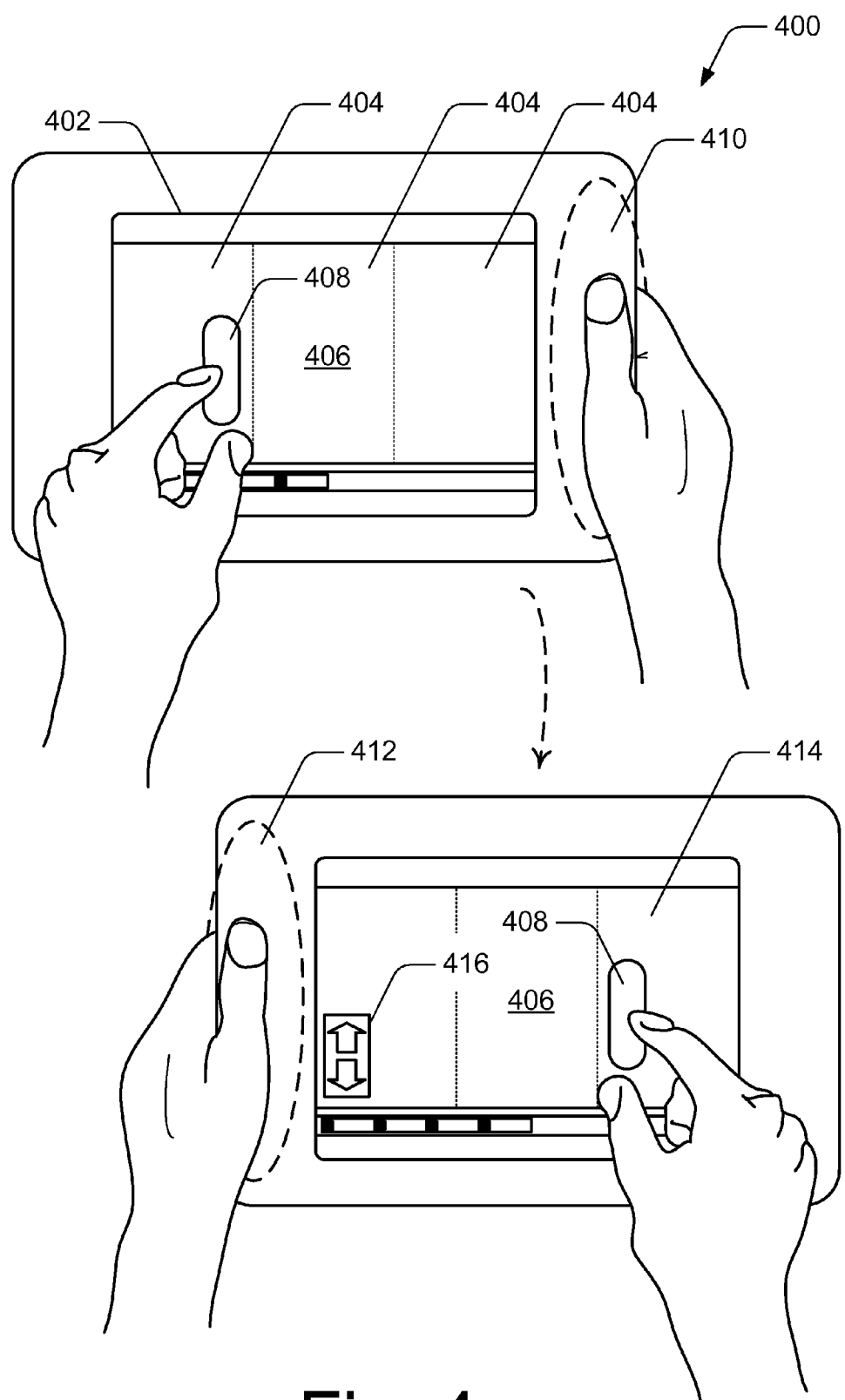
FIG. 4 illustrates another example of a portable device in accordance with one or more embodiments of user interface elements positioned for display.

FIG. 4 illustrates an example of a portable device 400 in accordance with one or more embodiments of user interface elements positioned for display. Portable device 400 (shown in two views) is an example of any of the various types of portable devices described with reference to FIG. 1. Portable device 400 includes an integrated display 402 that has various display regions 404 (as depicted by the dotted lines merely for illustration purposes) in which user interface elements can be displayed in a user interface 406. The display regions 404 do not necessarily represent actual physical divisions in a user interface or in the integrated display 402, but are shown for purposes of illustration and discussion only.

In this example, a user interface element 408 is displayed in the user interface 406 on the integrated display 402. For example, the user interface element 408 can be a user-selectable control that is associated with one or more applications (e.g., the media applications 128) and/or system software of the portable device. A device hold position 410 is also shown (as depicted by the dashed lines merely for illustration purposes) which corresponds to where the portable device 400 is grasped and/or held by a user. As illustrated in this example, a user is holding the portable device proximate the device hold position 410.

In an embodiment, a sensor or sensors 134 (FIG. 1) can sense or detect that a user grasps or holds the device, and can generate sensor input 136 that is received by the element display position service 132 that determines the device hold position 410. The element display position service 132 can then initiate the display of user interface element 408 in a display region 404 of the user interface 406 that is not adjacent or near the device hold position 410. This provides that the user interface element 408 is not obscured and enables a user to more easily interact with the user interface element, such as with the hand that is not grasping and/or holding onto the portable device at device hold position 410.

In various embodiments, a portrait view or a landscape view can be designated for a user interface on a portable device based on the device hold position. In this example, the device hold position 410 corresponds to a shorter side of the portable device, and thus the user interface 406 is displayed in a landscape orientation. Depending on where the portable device is being held, the element display position service 132 can determine either a portrait orientation or a landscape orientation to display the user interface 406 on the integrated display of the device based on where the portable device is grasped.

When a user changes where portable device 400 is being grasped or held, a new device hold position 412 can be detected (as depicted by the dashed lines merely for illustration purposes) which corresponds to where the portable device 400 is grasped and/or held by the user. For example, a user initially grasps the portable device 400 with a right hand at device hold position 410, and then changes to grasp the device with a left hand at device hold position 412. In an implementation, the element display position service 132 can determine the new device hold position 412 from received sensor input that indicates the user is holding the device at the device hold position 412. The element display position service 132 can then initiate the display of the user interface element 408 in a different one of the display regions 414 that is not adjacent to the device hold position 412. This provides that the user interface element 408 is displayed in a display region where the interface element will not be obscured or otherwise interfered with by the hand that is grasping or holding the portable device.

In other embodiments, a user interface element 416 can be positioned in a display region of the user interface 406 to allow user interaction with the user interface element 416 using a hand that is grasping or holding the portable device. For example, as the user grasps and/or holds portable device 400 with the left hand, the user interface element 416 is positioned in the user interface 406 to enable the user to interact with the user interface element with the thumb of the left hand (i.e., the grasping hand).

Figure 5:
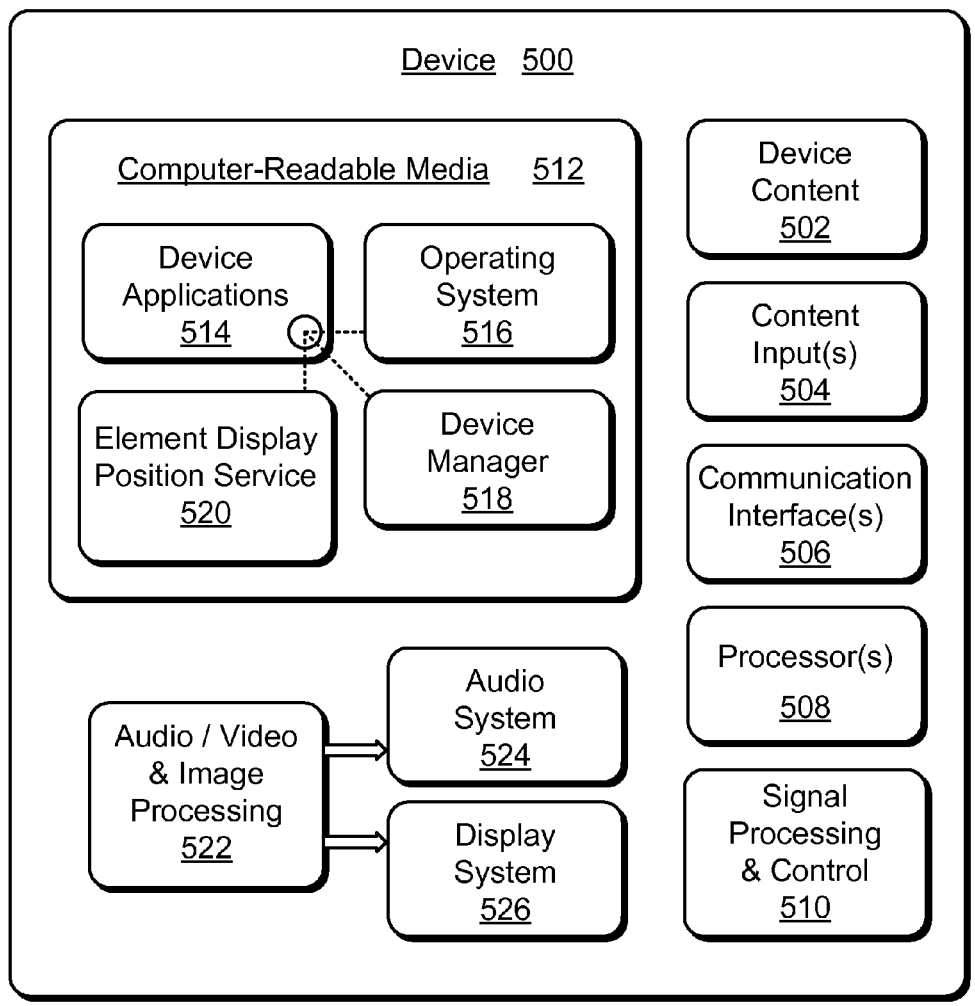
FIG. 5 illustrates various components of an example device that can implement embodiments of user interface elements positioned for display.

FIG. 5 illustrates various components of an example device 500 that can be implemented as any form of a portable, computing, electronic, appliance, and/or media device to implement various embodiments of user interface elements positioned for display. For example, device 500 can be implemented as any of the various portable devices described with reference to FIGS. 1-4.

Device 500 can include device content 502, such as configuration settings of the device, media content stored on the device, and/or information associated with a user of the device. Media content stored on device 500 can include any type of data as well as audio, video, and/or image media content. Device 500 can include one or more content inputs 504 via which media content can be received. In an embodiment, the content inputs 504 can include Internet Protocol (IP) inputs over which streams of media content are received via an IP-based network.

Device 500 further includes one or more communication interfaces 506 that can be implemented as any one or more of a serial and/or parallel interface, a wireless interface, any type of network interface, a modem, and as any other type of communication interface. The communication interfaces 506 provide a connection and/or communication links between device 500 and a communication network by which other electronic, computing, and communication devices can communicate data with device 500.

Device 500 can include one or more processors 508 (e.g., any of microprocessors, controllers, and the like) which process various computer-executable instructions to control the operation of device 500 and to implement embodiments of user interface elements positioned for display. Alternatively or in addition, device 500 can be implemented with any one or combination of hardware, firmware, or fixed logic circuitry that is implemented in connection with signal processing and control circuits which are generally identified at 510.

Device 500 can also include computer-readable media 512, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 512 provides data storage mechanisms to store the device content 502, as well as various device applications 514 and any other types of information and/or data related to operational aspects of device 500. For example, an operating system 516 can be maintained as a computer application with the computer-readable media 512 and executed on the processors 508. The device applications 514 can also include a device manager 518 and an element display position service 520. In this example, the device applications 514 are shown as software modules and/or computer applications that can implement various embodiments of user interface elements positioned for display.

Device 500 can also include an audio, video, and/or image processing system 522 that provides audio data to an audio system 524 and/or provides video or image data to a display system 526. The audio system 524 and/or the display system 526 can include any devices or components that process, display, and/or otherwise render audio, video, and image data. The audio system 524 and/or the display system 526 can be implemented as integrated components of the example device 500. Alternatively, audio system 524 and/or the display system 526 can be implemented as external components to device 500. Video signals and audio signals can be communicated from device 500 to an audio device and/or to a display device via an RF (radio frequency) link, S-video link, composite video link, component video link, DVI (digital video interface), analog audio connection, or other similar communication link.

Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Although embodiments of user interface elements positioned for display have been described in language specific to features and/or methods, it is to be understood that the subject of the appended claims is not necessarily limited to the specific features or methods described. Rather, the specific features and methods are disclosed as example implementations of user interface elements positioned for display.

The invention claimed is:

1. A method, comprising:

receiving sensor input from one or more sensors integrated with a portable device;

determining a device hold position based at least in part on the sensor input, the device hold position corresponding to where the portable device is grasped; and initiating a display of one or more user interface elements in a user interface on an integrated display of the portable device based on the device hold position that corresponds to where the portable device is grasped, the user interface including multiple display regions in which to display the one or more user interface elements to avoid the one or more user interface elements being obscured in one or more of a portrait orientation or a landscape orientation of the user interface based on the device hold position, the one or more user interface elements being displayed in one of the multiple display regions that is not adjacent to the device hold position to enable a user to interact with the one or more user interface elements via a hand that is not grasping the portable device at the device hold position.

2. A method as recited in claim 1, wherein a display position of the one or more user interface elements in the user interface is designated when the display of the one or more user interface elements is initiated, and wherein:

the device hold position is adjacent to a first display region of the user interface; and the display position of the one or more user interface elements corresponds to a second display region of the user interface that corresponds to one of the multiple display regions that is not adjacent to the device hold position.

3. A method as recited in claim 1, wherein a display position of the one or more user interface elements in the user interface is designated when the display of the one or more user interface elements is initiated, and wherein the device hold position is adjacent to a display region of the user interface that includes the display position of the one or more user interface elements.

4. A method as recited in claim 1, wherein a display position of the one or more user interface elements in the user interface is designated when the display of the one or more user interface elements is initiated, the method further comprising:

determining a new device hold position based at least in part on a change in the sensor input; and determining a new display position to display one or more of the user interface elements in the user interface, the new display position being based on the new device hold position.

5. A method as recited in claim 1, wherein one or more of the sensors include a non-contact sensor that senses where the portable device is grasped.

6. A method as recited in claim 1, wherein one or more of the sensors includes a contact sensor that senses where the portable device is grasped.

7. A method as recited in claim 1, wherein one or more of the sensors are integrated proximate a front surface of the portable device to sense where the portable device is grasped.

8. A method as recited in claim 1, wherein one or more of the sensors are integrated proximate a rear surface of the portable device to sense where the portable device is grasped.

9. A method as recited in claim 1, further comprising determining the portrait orientation or the landscape orientation for the user interface based on where the portable device is grasped.

10. A portable device, comprising:

an integrated display configured to display a user interface that includes one or more user interface elements and multiple display regions;

one or more sensors configured to generate sensor input;

an element display position service configured to:

receive the sensor input and determine a device hold position based at least in part on the sensor input, the device hold position corresponding to where the portable device is grasped; and determine a display position and which of the display regions in which to display the one or more user interface elements in the user interface on the integrated display, the display position and the display region both being determined based on the device hold position to avoid the one or more user interface elements being obscured in one or more of a portrait orientation or a landscape orientation of the user interface based on the device hold position, the display region being determined to be a display region that is not adjacent to the device hold position to enable a user to interact with the user interface element via a hand that is not grasping the device at the device hold position.

11. A portable device as recited in claim 10, wherein:

the device hold position is adjacent to a first display region of the user interface; and the display position of the one or more user interface elements corresponds to a second display region of the user interface that corresponds to the display region that is not adjacent to the device hold position.

12. A portable device as recited in claim 10, wherein:

the device hold position is adjacent to a display region of the user interface that includes the display position of the one or more user interface elements.

13. A portable device as recited in claim 10, wherein the interface configuration service is further configured to:

determine a new device hold position based at least in part on a change in the sensor input; and determine a new display position to display the one or more user interface elements in the user interface, the new display position being based on the new device hold position.

14. A portable device as recited in claim 10, wherein the interface configuration service is further configured to determine either the portrait orientation or the landscape orientation for the user interface based on where the portable device is grasped.

15. A portable device as recited in claim 10, wherein one or more of the sensors includes a contact sensor configured to sense where the portable device is grasped.

16. A portable device as recited in claim 10, wherein one or more of the sensors includes a non-contact sensor configured to sense where the portable device is grasped.

17. One or more computer-readable media comprising computer-executable instructions that, when executed, initiate an element display position service to:

receive sensor input from one or more sensors that are integrated with a portable device, the sensor input including an indication of where the portable device is grasped; and determine which of multiple display regions of a user interface to use to display one or more user interface elements on an integrated display of the portable device to avoid the one or more user interface elements being obscured in one or more of a portrait or a landscape orientation of the user interface based at least in part on the sensor input that indicates where the portable device is grasped, the display region being determined to be one of the multiple display regions that is not adjacent to a location on the portable device where the portable device is grasped to allow a user to interact with the one or more user interface elements via a hand that is not grasping the portable device.

18. One or more computer-readable media as recited in claim 17, further comprising computer-executable instructions that, when executed, initiate the element display position service to:

receive a change in the sensor input that indicates a change in where the portable device is grasped; and determine a new display position to display the one or more user interface elements in the user interface based at least in part on the change in where the portable device is grasped.

19. One or more computer-readable media as recited in claim 17, wherein the sensor input includes an indication that the portable device is not being held, and further comprising computer-executable instructions that, when executed, initiate the element display position service to clear the one or more user interface elements from the display of the user interface based at least in part on the indication that the portable device is not being held.

20. One or more computer-readable media as recited in claim 17, further comprising computer-executable instructions that, when executed, initiate the element display position service to designate the portrait orientation or the landscape orientation for the user interface based on where the portable device is grasped.

* * * * *